(12) United States Patent
Yang et al.

(10) Patent No.: US 11,766,111 B2
(45) Date of Patent: Sep. 26, 2023

(54) COSMETIC MIRROR

(71) Applicant: DONGGUAN POWERME PLASTIC MFG. CO., LTD., Dongguan (CN)

(72) Inventors: Guoxiang Yang, Dongguan (CN); Guowei Yang, Dongguan (CN)

(73) Assignee: DONGGUAN POWERME PLASTIC MFG. CO., LTD., Dongguan (CN)

( * ) Notice: Subject to any disclaimer, the term of this patent is extended or adjusted under 35 U.S.C. 154(b) by 34 days.

(21) Appl. No.: 17/561,719

(22) Filed: Dec. 24, 2021

(65) Prior Publication Data
US 2023/0165356 A1 Jun. 1, 2023

(30) Foreign Application Priority Data
Nov. 26, 2021 (CN) .......................... 2021229589289

(51) Int. Cl.
| | |
|---|---|
| A45D 42/00 | (2006.01) |
| A45D 42/10 | (2006.01) |
| G02B 5/08 | (2006.01) |
| G02B 7/182 | (2021.01) |
| A45D 42/16 | (2006.01) |
| A47G 1/04 | (2006.01) |

(52) U.S. Cl.
CPC ............. *A45D 42/00* (2013.01); *A45D 42/10* (2013.01); *A45D 42/16* (2013.01); *G02B 5/0808* (2013.01); *G02B 7/182* (2013.01); *G02B 7/1821* (2013.01); *A47G 1/04* (2013.01)

(58) Field of Classification Search
CPC .......... A45D 42/00; A45D 42/10; A47G 1/00; A47G 1/04; A47G 2001/002; G02B 5/0808; G02B 5/10; G02B 7/182; G02B 7/1821; G02B 7/198
USPC .......................... 359/872; 362/135, 141, 144
See application file for complete search history.

(56) References Cited

U.S. PATENT DOCUMENTS

| | | | | |
|---|---|---|---|---|
| 2,026,010 A * | 12/1935 | Ritz-Woller | ........... | A45D 42/10 |
| | | | | 362/346 |
| 5,997,149 A * | 12/1999 | Chu | ........ | A45D 42/10 |
| | | | | 362/802 |
| 6,273,585 B1 * | 8/2001 | Wu | ........ | F21V 33/004 |
| | | | | 362/135 |
| 7,341,356 B1 * | 3/2008 | Zadro | ................ | A45D 42/16 |
| | | | | 359/872 |
| 8,162,502 B1 * | 4/2012 | Zadro | ................ | F21V 33/004 |
| | | | | 362/427 |

(Continued)

*Primary Examiner* — Ricky D Shafer (57) ABSTRACT

A cosmetic mirror, includes a supporting frame, a mirror body, and a power-on mechanism. At least one light source component is disposed in the mirror body, and the mirror body is connected with the supporting frame. The mirror body includes N mirror surfaces, N is a number greater than or equal to one, each of the mirror surfaces includes a light transmitting region, and each of the light source components is disposed in the mirror body and corresponds to the mirror surfaces in a one-to-one manner. The power-on mechanism includes a power-on fixing assembly and a power-on movable assembly. When any one of the mirror surfaces is rotated to a front side, one of the light source components with respect to the one of the mirror surfaces rotated to the front side of the cosmetic mirror is lightened, and the remaining light source components are turned off.

13 Claims, 4 Drawing Sheets

(56) References Cited

U.S. PATENT DOCUMENTS

| | | | |
|---|---|---|---|
| 8,356,908 B1* | 1/2013 | Zadro | F21V 33/004 |
| | | | 362/135 |
| 9,347,660 B1* | 5/2016 | Zadro | A45D 42/08 |
| 11,576,507 B2* | 2/2023 | Boehm | A45D 42/14 |
| 2005/0068646 A1* | 3/2005 | Lev | A45D 42/24 |
| | | | 359/432 |
| 2013/0077292 A1* | 3/2013 | Zimmerman | A45D 42/00 |
| | | | 362/142 |
| 2018/0263362 A1* | 9/2018 | Yang | F21V 33/004 |
| 2019/0003699 A1* | 1/2019 | Mondora | A45D 42/10 |
| 2021/0364892 A1* | 11/2021 | Copeland | F16M 13/022 |

* cited by examiner

COSMETIC MIRROR

TECHNICAL FIELD

The present disclosure relates to a technical field of cosmetic mirrors, and in particular to a cosmetic mirror.

BACKGROUND

Cosmetic mirrors are one of common life tools in people' daily life. In past, when a cosmetic mirror is used, a light supplementing lamp often needs to be additionally disposed to provide good light rays. With development of science and technology, cosmetic mirrors having light supplementing function have appeared on market. Light rays of the cosmetic mirrors having the light supplementing function are projected from front and rear sides at same time, which wastes resources on one hand, and on the other hand, one side of each of the cosmetic mirrors has no sufficient light rays provided for users, thus use requirements of people cannot be met.

SUMMARY

In order to solve a technical problem that light rays of existing cosmetic mirrors are projected from front and rear sides at same time, which wastes resources on one hand, and on the other hand, one side of each of the cosmetic mirrors has no sufficient light rays provided for users, thus use requirements of people cannot be met, the present disclosure provides a cosmetic mirror.

In order to achieve the above purpose, a technical scheme adopted by the present disclosure is to provide a cosmetic mirror, including a supporting frame, a mirror body, and a power-on mechanism. At least one light source component is disposed in the mirror body, and the mirror body is connected with the supporting frame. The mirror body includes N mirror surfaces, and N is a number greater than or equal to one. Each of the mirror surfaces includes a light transmitting region, each of the light source components is disposed in the mirror body and corresponds to the mirror surfaces in a one-to-one manner, and a light beam of each of the light source components is emitted from the respective light transmitting region. The power-on mechanism includes a power-on fixing assembly and a power-on movable assembly, the power-on fixing assembly is fixed to the supporting frame and is connected with a power supply, and the power-on movable assembly is fixed to the mirror body and is connected with each of the light source components. The power-on movable assembly is movably connected with the power-on fixing assembly, and when any one of the mirror surfaces is rotated to a front side of the cosmetic mirror, one of the light source components with respect to the one of the mirror surfaces rotated to the front side of the cosmetic mirror is lightened, and the remaining light source components are turned off.

Furthermore, the power-on fixing assembly includes an elastic power connecting component, and the elastic power connecting component is fixed to the supporting frame.

The power-on movable assembly includes at least one conductive components, each of the conductive components is disposed on the mirror body at intervals around a rotation axis of the mirror body, and each of the conductive components is respectively connected to each of the light source components.

The elastic power connecting component elastically abuts against a respective one of conductive components connected to a respective one of the light source components of a respective one of the mirror surfaces when the perspective one of the mirror surfaces is rotated to the front side of the cosmetic mirror.

Furthermore, a switching shaft is extended from an end of the supporting frame. The mirror body includes an accommodating cavity and a switching interface, the switching interface is disposed on a side of the mirror body, the switching shaft is inserted into the switching interface, and the switching shaft rotates with respect to the switching interface.

The elastic power connecting component is disposed in the accommodating cavity and is fixed to the switching shaft, and the conductive components are fixed to a cavity wall of the accommodating cavity around an axis of the switching shaft.

Furthermore, the power-on fixing assembly further includes an insulating fixing component, the insulating fixing component is fixed to an end of the switching shaft, and the elastic power connecting component is fixed to the insulating fixing component.

Furthermore, the insulating fixing component includes a fixing plate and a fixing column, a first end of the fixing column is fixed to the fixing plate, a second end of the fixing column is extended into a switching cavity of the switching shaft and is fixed to the switching cavity of the switching shaft, and the switching cavity of the switching shaft is disposed in an extending direction of the switching shaft. The elastic power connecting component is fixed to the fixing plate.

Furthermore, the fixing column is locked in the switching cavity of the switching shaft.

Furthermore, the fixing column is clamped to the switching cavity of the switching shaft.

Furthermore, the fixing column is matched with the switching cavity of the switching shaft, and an outer contour of a cross section of the fixing column is an outer contour for preventing the fixing column from rotating with respect to the switching cavity of the switching shaft.

Furthermore, a positioning groove is defined on a surface, opposite to the fixing column, of the fixing plate. A power connecting interface is disposed on a groove bottom of the positioning groove. The elastic power connecting component is adapted to the positioning groove, an end of the elastic power connecting component includes an elastic protrusion, and the elastic protrusion is extended out of the power connecting interface.

Furthermore, a wiring channel communicated with the switching cavity of the switching shaft is disposed on the insulating fixing component.

Furthermore, the power-on movable assembly further includes an insulating movable component, the insulating movable component is limited to the cavity wall of the accommodating cavity. The insulating movable component includes a through hole, and the through hole is communicated with the switching interface. Each of the conductive components is fixed to the insulating movable component.

Furthermore, a limiting groove is defined on a peripheral side of the switching interface of the accommodating cavity, and a limiting table is disposed on one side of the insulating movable component where the one side of the insulating movable component faces the switching interface. The limiting table is inserted into the limiting groove and matched with the limiting groove, and an outer contour of a cross section of the limiting table is an outer contour for preventing the limiting table from rotating with respect to the limiting groove.

Furthermore, movable positioning grooves are defined at an interval on one side of the insulating movable component around an axis of the switching shaft where the one side of the insulating movable component is opposite to the switching interface. Each of the conductive components is in one-to-one correspondence with each of the movable positioning grooves and is respectively matched with the each of the movable positioning grooves.

Furthermore, the supporting frame is in a Y shape, the mirror body is disposed at a bifurcation position of the supporting frame, the mirror body is connected with two bifurcated supporting arms of the supporting frame, and the respective power-on mechanism is disposed on each of the two bifurcated supporting arms of the supporting frame.

Or, the cosmetic mirror further includes a conductive mechanism, and the two bifurcated supporting arms include a first bifurcated supporting arm and a second bifurcated supporting arm. The power-on mechanism is disposed between the first bifurcated supporting arm and the mirror body, and the conductive mechanism is disposed between the second bifurcated supporting arm and the mirror body. The conductive mechanism includes a conductive fixing assembly and a conductive movable assembly, the conductive fixing assembly is fixed to the two bifurcated supporting arms and is connected with the power supply, the conductive movable assembly is fixed to the mirror body and is connected with each of the light source components, and the conductive fixing assembly is in contact with the conductive movable assembly.

Furthermore, the mirror body includes a glass frame, mirror lenses, reflective plates, and light-transmitting plates. The glass frame includes the accommodating cavity and mounting cavities communicating with the accommodating cavity. The mirror lenses, the reflective plates, the light-transmitting plates, and the mounting cavities are respectively provided with N pieces and are in one-to-one correspondence. Each of the reflective plates is respectively fixed to one of the mounting cavities and faces one of the light-transmitting plates. Each of the light source components is fixed to one of the mounting cavities and faces one of the reflective plates. Each of the mirror lenses and each of the light-transmitting plates, fixed to a respective one of the mounting cavities, are sealed in an opening of the respective one of the mounting cavities.

The cosmetic mirror provided by the present disclosure has beneficial effects as follows.

The cosmetic mirror includes a supporting frame, a mirror body, and a power-on mechanism, at least one light source component is disposed in the mirror body, and the mirror body is rotatably connected with the supporting frame, which realizes free rotation of the mirror body and is convenient for the users to flexibly use the cosmetic mirror. The mirror body includes N mirror surfaces, and N is the number greater than or equal to one. Each of the mirror surfaces includes the light transmitting region, each of the light source components is disposed in the mirror body and corresponds to the respective light transmitting region. The power-on mechanism includes the power-on fixing assembly and the power-on movable assembly, the power-on fixing assembly is fixed to the supporting frame and is connected with the power supply outside the mirror body, the power-on movable assembly is fixed to the mirror body and is connected with each of the light source components. The power-on movable assembly is movably connected with the power-on fixing assembly, and when any one of the mirror surfaces is rotated to a front side of the cosmetic mirror, one of the light source components with respect to the one of the mirror surfaces rotated to the front side of the cosmetic mirror is lightened, and the remaining light source components are turned off. It may be understood that when any one of the mirror surfaces needs to be rotated to front (facing the users), the one of the light source components with respect to the one of the mirror surfaces rotated to the front side of the cosmetic mirror will be lightened, namely, the power-on movable assembly with respect to the one of the mirror surfaces rotated to the front side of the cosmetic mirror abuts against the power-on fixing assembly, so that a circuit is turned on, and the light source components with respect to the remaining mirror surfaces are in a circuit disconnection state, namely, are not lightened, thereby greatly saving energy, improving single-side light output rate, and meeting requirements of the users.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

REFERENCE NUMBER IN THE FIGURES

| | | | |
|---|---|---|---|
| cosmetic mirror | 1 | supporting frame | 100 |
| mirror body | 200 | power-on mechanism | 300 |
| mirror surface | 201 | light transmitting region | 202 |
| power-on fixing assembly | 310 | power-on movable assembly | 320 |
| elastic power connecting component | 311 | conductive component | 321 |
| switching shaft | 110 | accommodating cavity | 203 |
| switching interface | 204 | switching shaft | 1101 |
| insulating fixing component | 312 | fixing plate | 3121 |
| fixing column | 3122 | elastic clamping hook | 3123 |
| positioning groove | 301 | power connecting interface | 302 |
| elastic protrusion | 3111 | positioning column | 3112 |
| positioning hole | 303 | wiring channel | 304 |
| insulating movable component | 322 | through hole | 305 |
| limiting groove | 205 | limiting table | 3221 |
| movable positioning groove | 306 | bifurcated supporting arm | 120 |
| conductive mechanism | 400 | conductive fixing assembly | 410 |
| conductive movable assembly | 420 | glass frame | 210 |
| mirror lens | 220 | reflective plate | 230 |
| light-transmitting plate | 240 | mounting cavity | 206 |
| base | 500 | light source component | 250 |
| conductive component | 321a | insulating movable component | 322a |

DETAILED DESCRIPTION

In order to make objectives, technical solutions, and advantages of the present disclosure clearer, the present disclosure is further described in details below with reference to accompanying drawings and embodiments. It should be understood that the specific embodiments described herein are merely used to explain the present disclosure, and are not intended to limit the present disclosure.

It should be noted that when an element is referred to as being "fixed to" or "disposed on" another element, the element may be directly on the other element or the element may be indirectly fixed to or disposed on the other element by means of a third component. When an element is referred to as being "connected to" another element, the element may be directly connected to the other element or the element may be indirectly connected to the other element by means of a third component.

It should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In addition, the terms "first" and "second" are used for descriptive purposes only and cannot be understood as indicating or implying relative importance or implicitly indicating a number of indicated technical features. Thus, features defined with "first" and "second" may explicitly or implicitly include one or more of the features. In description of the present disclosure, "a plurality of" means two or more, unless specifically defined otherwise.

Figure 1:
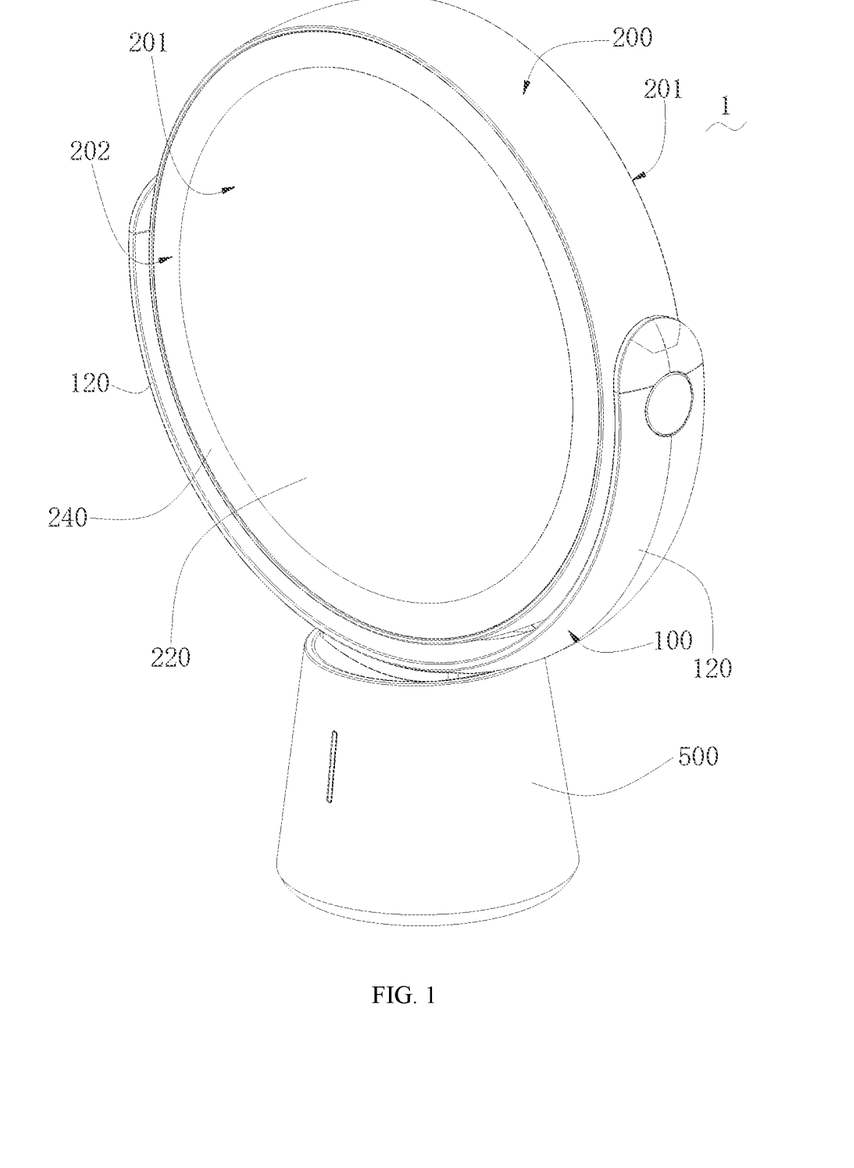
FIG. 1 is a three-dimensional schematic diagram of a cosmetic mirror according to one embodiment of the present disclosure.
Figure 2:
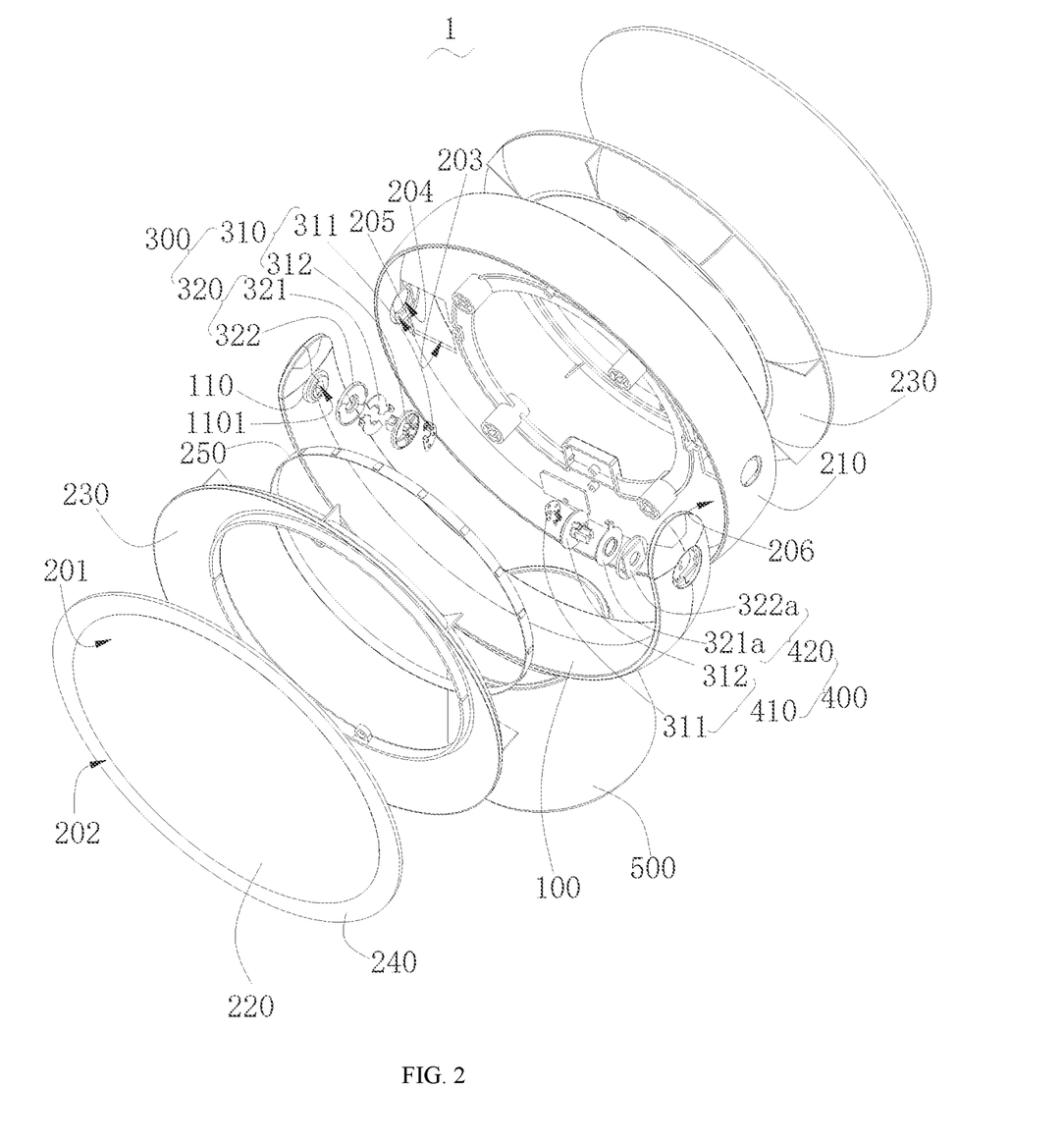
FIG. 2 is an exploded three-dimensional schematic diagram of the cosmetic mirror according to one embodiment of the present disclosure.

Referring to FIG. 1 and FIG. 2, the present disclosure provides a cosmetic mirror 1, including a supporting frame 100, a mirror body 200, and a power-on mechanism 300. At least one light source component 250 is disposed in the mirror body 200, and the mirror body 200 is connected with the supporting frame 100. The mirror body 200 includes N piece of mirror surfaces 201, and N is a number greater than or equal to one. Each of the mirror surfaces 201 includes a light transmitting region 202, each of the light source components 250 is disposed in the mirror body 200 and corresponds to the mirror surfaces 201 in a one-to-one manner, and a light beam of each of the light source components is emitted from the respective light transmitting region 202. The power-on mechanism 300 includes a power-on fixing assembly 310 and a power-on movable assembly 320, the power-on fixing assembly 310 is fixed to the supporting frame 100 and is connected with a power supply, and the power-on movable assembly 320 is fixed to the mirror body 200 and is connected with each of the light source components 250. The power-on movable assembly 320 is movably connected with the power-on fixing assembly 310, and when any one of the mirror surfaces 201 is rotated to a front side of the cosmetic mirror 1, that is, when facing a user, one of the light source components 250 with respect to the one of the mirror surfaces 201 rotated to the front side of the cosmetic mirror 1 is lightened, and the remaining light source components 250 are turned off.

In the present embodiment, the cosmetic mirror 1 includes a supporting frame 100, a mirror body 200, and a power-on mechanism 300. At least one light source component 250 is disposed in the mirror body 200. The mirror body 200 is rotatably connected to the supporting frame 100, so that free rotation of the mirror body 200 is achieved, thereby being convenient for users to flexibly use the cosmetic mirror. The mirror body 200 includes N piece of mirror surfaces 201, and N is the number greater than or equal to one. Each of the mirror surfaces 201 includes a light transmitting region 202, each of the light source components 250 is disposed in the mirror body 200 and corresponds to the light transmitting region 202 in a one-to-one manner. The power-on mechanism 300 includes a power-on fixing assembly 310 and a power-on movable assembly 320, the power-on fixing assembly 310 is fixed to the supporting frame 100 and is connected with a power supply outside the mirror body 200, and the power-on movable assembly 320 is fixed to the mirror body 200 and is connected with each of the light source components 250. The power-on movable assembly 320 is movably connected with the power-on fixing assembly 310, and when any one of the mirror surfaces 201 is rotated to a front side of the cosmetic mirror 1, one of the light source components 250 with respect to the one of the mirror surfaces 201 rotated to the front side of the cosmetic mirror 1 is lightened, and the remaining light source components 250 are turned off. It may be understood that when any one of mirror surfaces 201 needs to be turned to the front side (facing the users), the one of light source components 250 with respect to the one of the mirror surfaces 201 rotated to the front side of the cosmetic mirror 1 may be lightened, that is, the power-on movable assembly 320 with respect to the one of the mirror surfaces 201 rotated to the front side of the cosmetic mirror 1 abuts against the power-on fixing component 310 to realize circuit conduction, and the light source components 250 with respect to the remaining mirror surfaces 201 are in a circuit disconnection state, namely, are not lightened, thereby greatly saving energy, improving single-side light output rate, and meeting requirements of the users.

It may further be understood that the power-on movable assembly 320 synchronously rotates with the mirror body 200, and the power-on fixing assembly 310 is stationary and fixed with respect to the supporting frame 100, so that each of the light source components 250, facing a front side of each of the mirror surfaces 201, is electrically connected to an external power supply through abutting the power-on movable assembly 320 against the power-on fixing assembly 310. When the mirror body 200 rotates, the power-on movable assembly 320 slides with respect to the power-on fixing assembly 310 and maintains abutting. Thus, when the mirror body 200 rotates with respect to the supporting frame 100, a wire winding condition due to being directly connected through a power line may be effectively prevented, thereby prolonging a service life of the cosmetic mirror 1 and improving use experience of the users.

In the embodiment of the present disclosure, each of the light source components 250 includes a flexible printed circuit board (PCB) and a plurality of light beads disposed on the flexible PCB, and the plurality of light beads are capable of emitting light. The power-on movable assembly 320 is connected to the flexible PCB.

Figure 3:
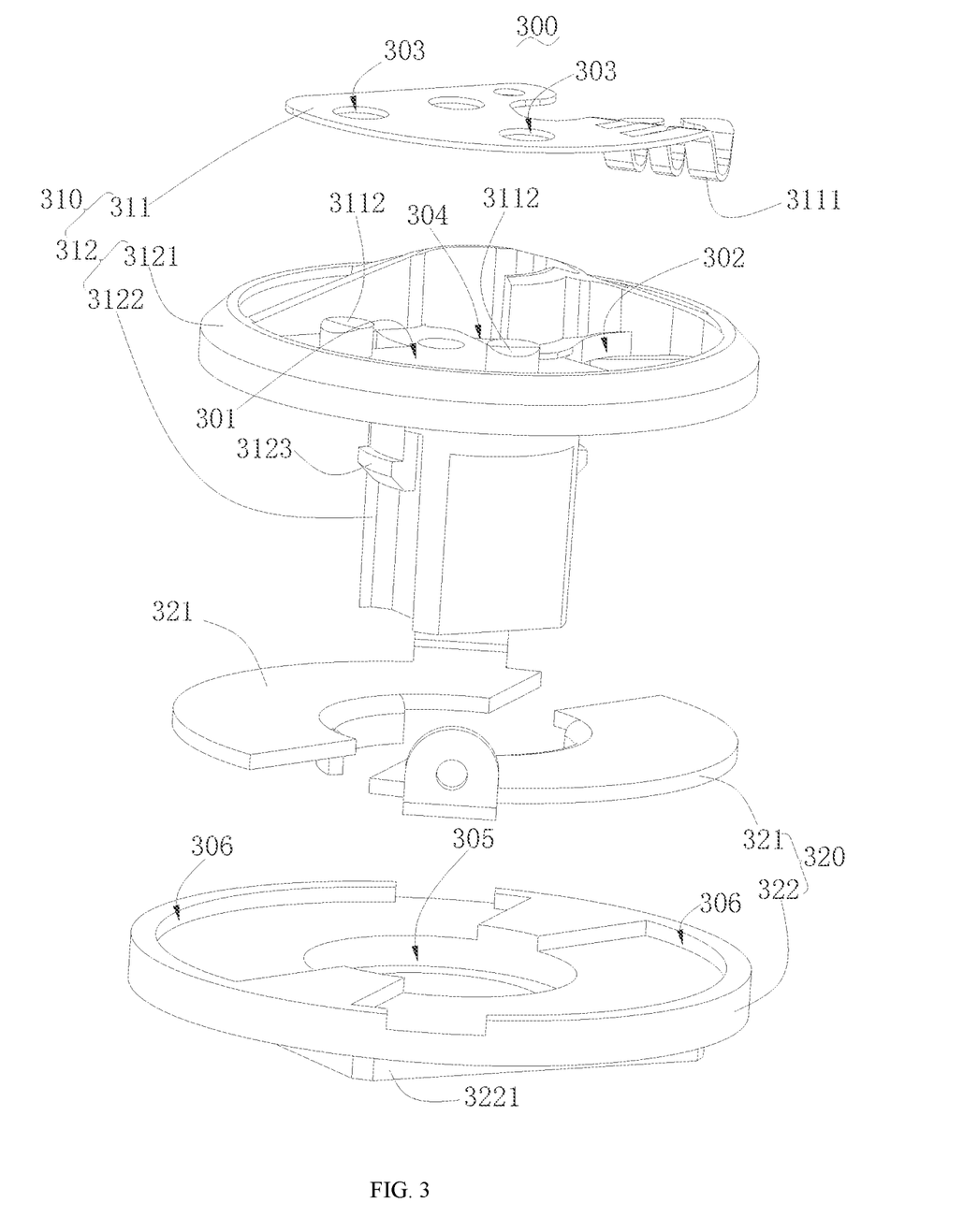
FIG. 3 is an exploded three-dimensional schematic diagram of a power-on mechanism according to one embodiment of the present disclosure.

Referring to FIG. 1 to FIG. 3, furthermore, the power-on fixing assembly 310 includes an elastic power connecting component 311, and the elastic power connecting component 311 is fixed to the supporting frame 100.

The power-on movable assembly 320 includes at least one conductive component 321, each of the conductive components 321 is disposed on the mirror body 200 at intervals around a rotation axis of the mirror body 200, and each of the conductive components 321 is respectively connected to each of the light source components 250.

The elastic power connecting component 311 elastically abuts against a respective one of the conductive components 321 connected to a respective one of the light source components 250 of a respective one of the mirror surfaces when the respective one of the mirror surfaces 201 is rotated to the front side (facing the users) of the cosmetic mirror 1, so as to achieve the light supplementing effect.

Referring to FIG. 1 to FIG. 3, specifically, a switching shaft 110 is extended from an end of the supporting frame 100. The mirror body 200 includes an accommodating cavity 203 and a switching interface 204, the switching interface 204 is disposed on a side of the mirror body 200, the switching shaft 110 is inserted into the switching interface 204, and the switching shaft 110 rotates with respect to the switching interface 204. The elastic power connecting component 311 is disposed in the accommodating cavity 203 and is fixed to the switching shaft 110, and the conductive components 321 are fixed to a cavity wall of the accommodating cavity 203 around an axis of the switching shaft 110, so that the mirror body 200 is rotatably connected to the supporting frame 100, and at the same time, the power-on mechanism 300 is disposed in the accommodating cavity 203 to have a reasonable space use of the cosmetic mirror 1, thereby making the whole cosmetic mirror neater.

In the embodiment, a wire passing cavity (not shown in the drawings) is defined in an extension direction of the supporting frame 100, and is configured to allow a conductive wire to pass through. The switching shaft 110 includes a switching cavity 1101 communicated with the wire passing cavity, and the conductive wire passes through the switching cavity 1101 and is connected to the elastic power connecting component 311 having conductive characteristic.

Figure 4:
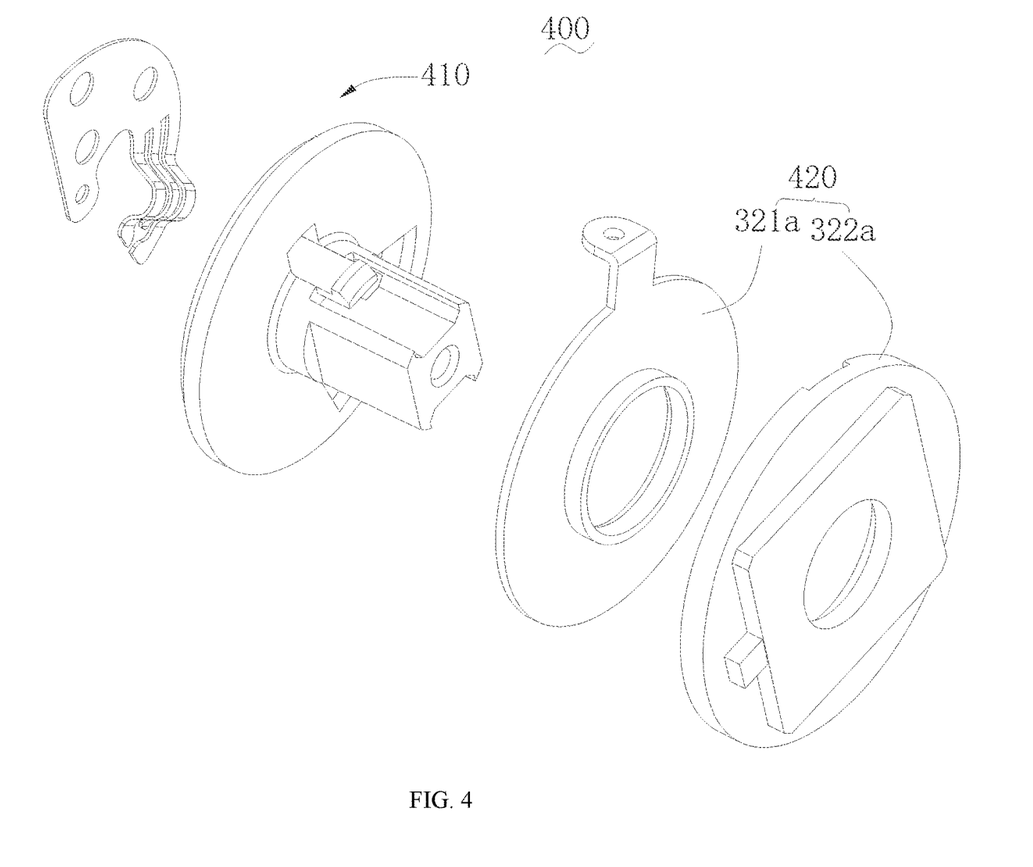
FIG. 4 is an exploded three-dimensional exploded schematic diagram of a conductive mechanism according to one embodiment of the present disclosure.

Referring to FIG. 2 to FIG. 4, furthermore, the power-on fixing assembly 310 further includes an insulating fixing component 312, the insulating fixing component 312 is fixed to an end of the switching shaft 110, and the elastic power connecting component 311 is fixed to the insulating fixing component 312.

Referring to FIG. 1 to FIG. 3, furthermore, the insulating fixing component 312 includes a fixing plate 3121 and a fixing column 3122, a first end of the fixing column 3122 is fixed to the fixing plate 3121, a second end of the fixing column 3122 is extended into a switching cavity 1101 of the switching shaft 110 and is fixed to the switching cavity 1101 of the switching shaft 110, the switching cavity 1101 of the switching shaft 110 is disposed in an extending direction of the switching shaft 110, and the elastic power connecting component 311 is fixed to the fixing plate 3121, thereby effectively improving stability of the elastic power connecting component 311.

The fixing column 3122 is locked in the switching cavity 1101 of the switching shaft 110. In the present embodiment, the fixing column 3122 is fixed to the switching cavity 1101 through screws.

The fixing column 3122 is clamped to the switching cavity 1101 of the switching shaft 110. In the present embodiment, each of elastic clamping hooks 3123 is engaged with each of clamping grooves in a clamping manner, so that the fixing column 3122 is detachably connected.

The fixing column 3122 is matched with the switching cavity 1101 of the switching shaft 110, and an outer contour of a cross section of the fixing column 3122 is an outer contour for preventing the fixing column 3122 from rotating with respect to the switching cavity 1101 of the switching shaft 110. A shape of the outer contour of the cross section of the fixing column 3122 is non-circular and may be oval, polygonal, long-strip oval, fan-shaped and so on, so long as the fixing column 3122 never circumferentially rotates with respect to the switching cavity 1101. In this way, a winding phenomenon of the conductive wire is effectively prevented.

Referring to FIG. 1 to FIG. 3, furthermore, a positioning groove 301 is defined on a surface, opposite to the fixing column 3122 of the fixing plate 3121, a power connecting interface 302 is disposed on a groove bottom of the positioning groove 301, the elastic power connecting component 311 is adapted to the positioning groove 301, an end of the elastic power connecting component 311 includes an elastic protrusion 3111, and the elastic protrusion 3111 is extended out of the power connecting interface 302. In the present embodiment, the elastic protrusion 3111 of the elastic power connecting component 311 elastically abuts against each of the conductive components 321, which belongs to flexible contact, and effectively prevents abrasion between the elastic power connecting component 311 and each of the conductive components 321, otherwise causing the abrasion of the elastic power connecting component 311 and each of the conductive components 321, and reducing the service life. The elastic power connecting component 311 is matched with the positioning groove 301, so that positioning and assembling of the elastic power connecting component 311 are achieved, on one hand, mounting efficiency is improved, and on the other hand, the elastic power connecting component 311 is convenient to directly align with each of the conductive components 321.

The elastic protrusion 3111 is a protrusion formed after bending deformation of an end portion of the elastic power connecting component 311.

At least one positioning column 3112 protrudes from the groove bottom of the positioning groove 301, positioning holes 303 are defined on the elastic power connecting component 311 with respect to the positioning columns 3112, and each of the positioning columns 3112 is inserted into each of the positioning holes 303, so that when each of the positioning columns 3112 is installed, an installation position is quickly aligned, and mounting efficiency is further improved.

In the present embodiment, the elastic power connecting component 311 is a tab having a conductive characteristic, and each of the conductive components 321 is a conductive sheet having a conductive characteristic.

Referring to FIG. 1 to FIG. 3, furthermore, a wiring channel 304 communicated with the switching cavity 1101 of the switching shaft 110 is disposed on the insulating fixing component 312. After the conductive wire passes through the switching cavity 1101, the conductive wire then passes through the wiring channel 304 and is connected to the elastic power connecting component 311.

Referring to FIG. 1 to FIG. 3, furthermore, the power-on movable assembly 320 further includes an insulating movable component 322, the insulating movable component 322 is limited to the cavity wall of the accommodating cavity 203, the insulating movable component 322 includes a through hole 305, the through hole 305 is communicated with the switching interface 204, and each of the conductive components 321 is fixed to the insulating movable component 322. In this way, each of the conductive components 321 is assembled with the insulating movable component 322 outside, and then the insulating movable component 322 is mounted at the switching interface 204, thereby improving mounting efficiency, and effectively preventing electric leakage of each of the conductive components 321.

The fixing column 3122 of the insulating fixing component 312 pass through the through hole 305 of the insulating movable component 322 and extends into the switching cavity 1101 of the switching shaft 110, and is clamped to the insulating movable component 322.

Referring to FIG. 1 to FIG. 3, furthermore, a limiting groove 205 is defined on a peripheral side of the switching interface 204 of the accommodating cavity 203 of the mirror body 200, a limiting table 3221 is disposed on one side of the insulating movable component 322 where the one side of the insulating movable component 322 faces the switching interface 204, the limiting table 3221 is inserted into the limiting groove 205 and matched with the limiting groove 205, and an outer contour of a cross section of the limiting table 3221 is an outer contour for preventing the limiting table 3221 from rotating with respect to the limiting groove 205.

In the embodiment, the outer contour of the cross section of the limiting table 3221 is non-circular, and may be oval, polygonal, long-strip oval, fan-shaped and so on, so long as the limiting table never circumferentially rotates with respect to the limiting groove 205. In this way, a circumferential displacement of each of the conductive components 321 is more effectively prevented, and each of the conductive components is further prevented from being unable to accurately interface with the elastic power connecting component 311 to affect a light-up timing of one of the light source components 250 where the one of the light source components 250 faces forward.

Referring to FIG. 1 to FIG. 3, furthermore, movable positioning grooves 306 are defined at an interval on one side of the insulating movable component 322 around an axis of the switching shaft 110 where the one side of the insulating movable component 322 is opposite to the switching interface 204. Each of the conductive components 321 is in one-to-one correspondence with each of the movable positioning grooves 306 and is respectively matched with each of the movable positioning grooves 306 to achieve positioning and mounting of each of the conductive components 321.

Referring to FIG. 1, FIG. 2 and FIG. 4, furthermore, the supporting frame 100 is in a Y shape, the mirror body 200 is disposed at a bifurcation position of the supporting frame 100, the mirror body 200 is connected with two bifurcated supporting arms 120 of the supporting frame 100, and the respective power-on mechanism 300 is disposed on each of the two bifurcated supporting arms 120 of the supporting frame 100. It may be understood that when any one of the mirror surfaces 201 rotates to the front side of the cosmetic mirror 1, the conductive lines in each of the bifurcated supporting arms 120 are respectively and electrically connected to each of the light source components 250 with respect to each of the mirror surfaces 201 located on the front side of the cosmetic mirror 1, and the two conductive lines are respectively and electrically connected to the positive and negative electrodes of the external power supply, so that a closed loop is integrally formed, of course, the closed loop is continuously switched along with rotation of the mirror body 200.

As an alternative, the cosmetic mirror further includes a conductive mechanism 400, and the two bifurcated supporting arms includes a first bifurcated supporting arm 120 and a second bifurcated supporting arm 120. The power-on mechanism 300 is disposed between the first bifurcated supporting arm 120 and the mirror body 200, and the conductive mechanism 400 is disposed between the second bifurcated supporting arm 120 and the mirror body 200. The conductive mechanism 400 includes a conductive fixing assembly 410 and a conductive movable assembly 420, the conductive fixing assembly 410 is fixed to the two bifurcated supporting arms 120 and is connected with the power supply, the conductive movable assembly 420 is fixed to the mirror body 200 and is connected with each of the light source components 250, and the conductive fixing assembly 410 is in contact with the conductive movable assembly 420.

In the present embodiment, the conductive fixing assembly 410 and the power-on fixing assembly 310 are same in structure, mounting structure and mounting position, and details are not described herein again. The conductive movable assembly 420 and the power-on movable assembly 320 are substantially the same in the structure, the mounting structure and the mounting position, and difference lies in that the conductive movable assembly 420 includes a conductive component 321a, and a number of movable positioning grooves 306 on the respective insulating movable component 322a is further one, and movable positioning grooves 306 are configured to position and mount a conductive component 321. The elastic power connecting component 311 of the conductive fixing assembly 410 and the conductive component 321a of the conductive movable assembly 420 are in a normal contact state. The two conductive wires are respectively electrically connected with the positive and negative electrodes of the external power supply, so that the closed loop is integrally formed, and only when the elastic power connecting component 311 of the power-on fixing assembly 310 is disconnected from the conductive component 321a of the power-on movable assembly 320, the whole closed loop is in an open circuit state.

The two bifurcated supporting arms 120 of the supporting frame 100 together form a shape of C-shaped, U-shaped, V-shaped, etc., which is matched with the peripheral contour of the mirror body 200, so that on one hand, support of the mirror body 200 is achieved, on the other hand, free rotation of the mirror body 200 is achieved, and moreover, the overall space occupancy rate of the cosmetic mirror 1 is effectively reduced.

The wire passing cavity (not shown in the figure) is defined in the extension direction of each of the two bifurcated supporting arms 120 of the supporting frame 100, and is configured to allow the conductive wire to pass through. In the present embodiment, two wires are disposed, one end of each of the two wires is respectively electrically connected to the positive and negative electrodes of the external power supply, and the other end of each of the two wires passes through the wire passing cavity, the switching cavity 1101 and the wiring channel 304 of each of the two bifurcated supporting arms 120, and the other end of each of the two wires is connected to the elastic power connecting component 311. In this way, a closed loop is formed between the light-emitting component and the external power supply.

Referring to FIG. 1 to FIG. 3, furthermore, the mirror body 200 includes a glass frame 210, mirror lenses 220, reflective plates 230, and light-transmitting plates 240. The glass frame 210 includes the accommodating cavity 230 and mounting cavities 206 communicating with the accommodating cavity 230. The mirror lenses 220, the reflective plates 230, the light-transmitting plates 240, and the mounting cavities 206 are respectively provided with N pieces and are in one-to-one correspondence. Each of the reflective plates 230 is respectively fixed to one of the mounting cavities 206 and faces one of the light-transmitting plates 240, each of the light source components 250 is fixed to one of the mounting cavities 206 and faces one of the reflecting plates 230, each of the mirror lenses 220 and each of the light-transmitting plates 240, fixed to a respective one of the mounting cavities 206, are sealed in an opening of the respective one of the mounting cavities 206. In this way, light emitting rate of each of the mirror surfaces 201 is effectively improved.

The cosmetic mirror 1 includes N pieces of mirror surfaces 201, namely, there are N pieces of mirror lenses 220. In the N pieces of mirror lenses 220, at least one mirror lenses 220 are conventional mirror lenses, it may be understood that the conventional mirror lenses are mirror lenses without amplification effect. The remaining mirror lenses 220 are disposed according to different amplification ratios (e.g., 2 times, 5 times, 10 times, etc.), and when the remaining mirror lenses 220 face the users, the light source components 250 located on a same side are lightened, and rest of the mirror lenses 220 are kept in an off state, so that energy is saved, the light emitting rate of the using side of the cosmetic mirror 1 is effectively improved, light supplementing effect is improved, and different use requirements of the users are met. In the present embodiment, the cosmetic mirror 1 includes two front and rear mirror lenses 220, one is a conventional mirror lens, and the other is a magnifying mirror lens, the two mirror lenses 220 are determined according to different use requirements.

In the present embodiment, the cosmetic mirror 1 further includes a base 500 having a control circuit, and a bottom end portion of the supporting frame 100 is fixed to the base 500. The conductive lines connected to the control circuit are electrically connected to the elastic power connecting component 311 through the two bifurcated supporting arms 120 of the supporting frame 100.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A cosmetic mirror, comprising:
   a supporting frame;
   a mirror body; and
   a power-on mechanism;
   wherein light source component components is disposed in the mirror body, the mirror body is connected with the supporting frame; the mirror body comprises mirror surfaces; each of the mirror surfaces comprises a light transmitting region, each of the light source components is disposed in the mirror body and corresponds to the mirror surfaces in a one-to-one manner, a light beam of each of the light source components is emitted from a respective light transmitting region; the power-on mechanism comprises a power-on fixing assembly and a power-on movable assembly, the power-on fixing assembly is fixed to the supporting frame and is connected with a power supply, the power-on movable assembly is fixed to the mirror body and is connected with each of the light source components, the power-on movable assembly is movably connected with the power-on fixing assembly, and when any one of the mirror surfaces is rotated to a front side of the cosmetic mirror, one of the light source components with respect to the one of the mirror surfaces rotated to the front side of the cosmetic mirror is lightened, and remaining light source components are turned off wherein the power-on fixing assembly comprises an elastic power connecting component, the elastic power connecting component is fixed to the supporting frame;
   the power-on movable assembly comprises conductive components, each of the conductive components is disposed on the mirror body at intervals around a rotation axis of the mirror body, and each of the conductive components is respectively connected to each of the light source components; and
   the elastic power connecting component elastically abuts against a respective one of the conductive components connected to a respective one of the light source components of a respective one of the mirror surfaces when the respective one of the mirror surfaces is rotated to the front side of the cosmetic mirror;
   wherein a switching shaft is extended from an end of the supporting frame; the mirror body comprises an accommodating cavity and a switching interface, the switching interface is disposed on a side of the mirror body, the switching shaft is inserted into the switching interface, and the switching shaft rotates with respect to the switching interface; and
   the elastic power connecting component is disposed in the accommodating cavity and is fixed to the switching shaft, and the conductive components are fixed to a cavity wall of the accommodating cavity around an axis of the switching shaft.

2. The cosmetic mirror according to claim 1, wherein the power-on fixing assembly further comprises an insulating fixing component, the insulating fixing component is fixed to an end of the switching shaft, and the elastic power connecting component is fixed to the insulating fixing component.

3. The cosmetic mirror according to claim 2, wherein the insulating fixing component comprises a fixing plate and a fixing column, a first end of the fixing column is fixed to the fixing plate, a second end of the fixing column is extended into a switching cavity of the switching shaft and is fixed to the switching cavity of the switching shaft, the switching cavity of the switching shaft is disposed in an extending direction of the switching shaft; and the elastic power connecting component is fixed to the fixing plate.

4. The cosmetic mirror according to claim 3, wherein the fixing column is locked in the switching cavity of the switching shaft.

5. The cosmetic mirror according to claim 3, wherein the fixing column is clamped to the switching cavity of the switching shaft.

6. The cosmetic mirror according to claim 3, wherein the fixing column is matched with the switching cavity of the switching shaft, and an outer contour of a cross section of the fixing column is an outer contour for preventing the fixing column from rotating with respect to the switching cavity of the switching shaft.

7. The cosmetic mirror according to claim 3, wherein a positioning groove is defined on a surface, opposite to the fixing column, of the fixing plate, a power connecting interface is disposed on a groove bottom of the positioning groove, the elastic power connecting component is adapted to the positioning groove, an end of the elastic power connecting component comprises an elastic protrusion, and the elastic protrusion is extended out of the power connecting interface.

8. The cosmetic mirror according to claim 2, wherein a wiring channel communicated with the switching cavity of the switching shaft is disposed on the insulating fixing component.

9. The cosmetic mirror according to claim 1, wherein the power-on movable assembly further comprises an insulating movable component, the insulating movable component is limited to the cavity wall of the accommodating cavity, the insulating movable component comprises a through hole, the through hole is communicated with the switching interface; and each of the conductive components is fixed to the insulating movable component.

10. The cosmetic mirror according to claim 9, wherein a limiting groove is defined on a peripheral side of the switching interface of the accommodating cavity, a limiting table is disposed on one side of the insulating movable component where the one side of the insulating movable component faces the switching interface, the limiting table is inserted into the limiting groove and matched with the limiting groove, and an outer contour of a cross section of the limiting table is an outer contour for preventing the limiting table from rotating with respect to the limiting groove.

11. The cosmetic mirror according to claim 9, wherein movable positioning grooves are defined at an interval on one side of the insulating movable component around an axis of the switching shaft where the one side of the insulating movable component is opposite to the switching interface; each of the conductive components is in one-to-one correspondence with each of the movable positioning grooves and is respectively matched with the movable positioning grooves.

12. The cosmetic mirror according to claim 1, wherein the supporting frame is in a Y shape, the mirror body is disposed at a bifurcation position of the supporting frame, the mirror body is connected with two bifurcated supporting arms of the supporting frame, and the respective power-on mechanism is disposed on each of the two bifurcated supporting arms of the supporting frame; or the cosmetic mirror further comprises a conductive mechanism, and the two bifurcated supporting arms comprise a first bifurcated supporting arm and a second bifurcated supporting arm; the power-on mechanism is disposed between the first bifurcated supporting arm and the mirror body, the conductive mechanism is disposed between the second bifurcated supporting arm and the mirror body; the conductive mechanism comprises a conductive fixing assembly and a conductive movable assembly, the conductive fixing assembly is fixed to the two bifurcated supporting arms and is connected with the power supply, the conductive movable assembly is fixed to the mirror body and is connected with each of the light source components, and the conductive fixing assembly is in contact with the conductive movable assembly.

13. The cosmetic mirror according to claim 1, wherein the mirror body comprises a glass frame, mirror lenses, reflective plates, and light-transmitting plates; the glass frame comprises the accommodating cavity and mounting cavities communicating with the accommodating cavity; each of the reflective plates is respectively fixed to one of the mounting cavities and faces one of the light-transmitting plates, each of the light source components is fixed to one of the mounting cavities and faces one of the reflecting plates, each of the mirror lenses and each of the light-transmitting plates, fixed to a respective one of the mounting cavities, are sealed in an opening of the respective one of the mounting cavities.

* * * * *